(12) United States Patent
Zhang et al.

(10) Patent No.: US 12,446,746 B2
(45) Date of Patent: Oct. 21, 2025

(54) BENDABLE JOINT, CLEANER CONNECTING PIPE, AND CLEANER

(71) Applicants: BEIJING XIAOMI MOBILE SOFTWARE CO., LTD., Beijing (CN); BEIJING SHUNZAO TECHNOLOGY CO., LTD., Beijing (CN)

(72) Inventors: Tiantian Zhang, Beijing (CN); Cheng Tang, Beijing (CN); Fei Duan, Beijing (CN)

(73) Assignees: BEIJING XIAOMI MOBILE SOFTWARE CO., LTD., Beijing (CN); BEIJING SHUNZAO TECHNOLOGY CO., LTD., Beijing (CN)

( * ) Notice: Subject to any disclaimer, the term of this patent is extended or adjusted under 35 U.S.C. 154(b) by 565 days.

(21) Appl. No.: 17/900,850

(22) Filed: Aug. 31, 2022

(65) Prior Publication Data

US 2023/0375109 A1    Nov. 23, 2023

(30) Foreign Application Priority Data

May 19, 2022 (CN) .......................... 202221236816.0

(51) Int. Cl.
*A47L 9/24* (2006.01)
*F16B 7/04* (2006.01)
*F16C 11/10* (2006.01)
*F16L 27/02* (2006.01)
(Continued)

(52) U.S. Cl.
CPC .............. *A47L 9/242* (2013.01); *F16B 7/042* (2013.01); *F16C 11/10* (2013.01); *F16L 27/023* (2013.01);
(Continued)

(58) Field of Classification Search
CPC .. A47L 9/24; A47L 9/242; A47L 9/248; F16B 7/042; F16C 11/10; F16C 11/103;
(Continued)

(56) References Cited

U.S. PATENT DOCUMENTS 4,286,353 A * 9/1981 Roche .................... F16C 11/10
403/81
8,296,901 B2 * 10/2012 Rosenzweig ........... A47L 9/242
285/305
(Continued)

FOREIGN PATENT DOCUMENTS

CN      208331514 U     1/2019
DE   202017002073 U1    6/2017
(Continued)

OTHER PUBLICATIONS

Extended European Search Report of EP Application No. 22192764.3 dated May 17, 2023, (6p).

*Primary Examiner* — Josh Skroupa
(74) *Attorney, Agent, or Firm* — Arch & Lake LLP

(57) ABSTRACT

A bendable joint includes a first articulation pipe, a second articulation pipe, and a lock. The first articulation pipe includes a first articulation portion at one end. The second articulation pipe includes a second articulation portion at one end. The first articulation portion is articulated with the second articulation portion so that the first articulation pipe is rotatable relative to the second articulation pipe. The lock is on the first articulation pipe and is configured to lock and adjust relative positions of the first articulation pipe and the second articulation pipe.

16 Claims, 3 Drawing Sheets

(51) Int. Cl.
*F16L 33/32* (2006.01)
(52) U.S. Cl.
CPC ....... *F16L 33/32* (2013.01); *Y10T 403/32361* (2015.01)
(58) Field of Classification Search
CPC . F16L 27/023; F16L 33/32; Y10T 403/32262; Y10T 403/32327; Y10T 403/32336; Y10T 403/32361; Y10T 403/32401; Y10T 403/32442; Y10T 403/32451; Y10T 403/32459; Y10T 403/591; Y10T 403/598; Y10T 403/599; Y10T 403/602
USPC .... 15/144.1, 144.2; 403/84, 92, 93, 96, 101, 403/106, 107, 108, 322.1, 324, 325, 327
See application file for complete search history.

(56) References Cited

U.S. PATENT DOCUMENTS

| | | | |
|---|---|---|---|
| 8,357,005 B2* | 1/2013 | Hu | H01R 13/6275 |
| | | | 439/379 |
| 10,966,581 B2* | 4/2021 | Innes | A47L 9/24 |
| 2006/0156510 A1* | 7/2006 | Park | A47L 9/248 |
| | | | 15/414 |

FOREIGN PATENT DOCUMENTS

| | | | | |
|---|---|---|---|---|
| EP | 1683464 A2 | | 7/2006 | |
| EP | 2409893 A2 * | | 1/2012 | ............. B62B 9/203 |
| WO | WO-02064986 A1 * | | 8/2002 | ............... B62B 9/20 |

* cited by examiner

BENDABLE JOINT, CLEANER CONNECTING PIPE, AND CLEANER

CROSS-REFERENCE TO RELATED APPLICATION

The present application is based on and claims priority to Chinese Patent Application No. 202221236816.0 filed on May 19, 2022, the entire content of which is incorporated herein by reference for all purposes.

BACKGROUND

Cleaners are widely used for cleaning in daily life and can be used to clean regions such as floors, areas under beds and sofas, and cabinet tops. A cleaner generally includes a main body, a cleaning head, and a connection rod capable of connecting the main body and the cleaning head.

In order to make it convenient for users to clean regions such as cabinet tops, areas under sofas and beds by cleaners, the cleaners are equipped with bendable joints or bendable extension tubes.

In the related art, locks of the bendable joints or the bendable extension tubes are complex in operation and are not user-friendly; or the locks are not firm enough and the bendable joints have low strength, which cannot be stably maintained in a horizontal straight state or at a predetermined bending angle during use and leads to poor user experience.

SUMMARY

The present disclosure relates to a field of cleaners, and more particularly, a bendable joint, a cleaner connecting pipe, and a cleaner.

A bendable joint according to a first aspect of the present disclosure includes: a first articulation pipe, a second articulation pipe, and a lock. The first articulation pipe has a first articulation portion at an end of the first articulation pipe. The second articulation pipe has a second articulation portion at an end of the second articulation pipe. The first articulation portion is articulated with the second articulation portion, and the first articulation pipe is rotatable relative to the second articulation pipe. The lock is on the first articulation pipe and is configured to lock and adjust relative positions of the first articulation pipe and the second articulation pipe.

A cleaner connecting pipe according to a second aspect of the present disclosure includes a first pipe body, a second pipe body, and a bendable joint. The bendable joint includes: a first articulation pipe, a second articulation pipe, and a lock. The first articulation pipe has a first articulation portion at an end of the first articulation pipe. The second articulation pipe has a second articulation portion at an end of the second articulation pipe. The first articulation portion is articulated with the second articulation portion, and the first articulation pipe is rotatable relative to the second articulation pipe. The lock is on the first articulation pipe and is configured to lock and adjust relative positions of the first articulation pipe and the second articulation pipe. The first pipe body is coupled to the first articulation pipe, and the second pipe body is coupled to the second articulation pipe.

A cleaner according to a third aspect of the present disclosure includes a main body, a cleaning head, and a cleaner connecting pipe. The cleaner connecting pipe has a first end coupled to the main body and a second end coupled to the cleaning head. The cleaner connecting pipe includes a first pipe body, a second pipe body, and a bendable joint. The bendable joint includes: a first articulation pipe, a second articulation pipe, and a lock. The first articulation pipe has a first articulation portion at an end of the first articulation pipe. The second articulation pipe has a second articulation portion at an end of the second articulation pipe. The first articulation portion is articulated with the second articulation portion, and the first articulation pipe is rotatable relative to the second articulation pipe. The lock is on the first articulation pipe and is configured to lock and adjust relative positions of the first articulation pipe and the second articulation pipe. The first pipe body is coupled to the first articulation pipe, and the second pipe body is coupled to the second articulation pipe.

BRIEF DESCRIPTION OF DRAWINGS

The accompanying drawings, which are incorporated herein and constitute a part of the specification, illustrate examples consistent with the present disclosure and, together with the specification, serve to explain principles of the present disclosure.

DETAILED DESCRIPTION

Figure 1:
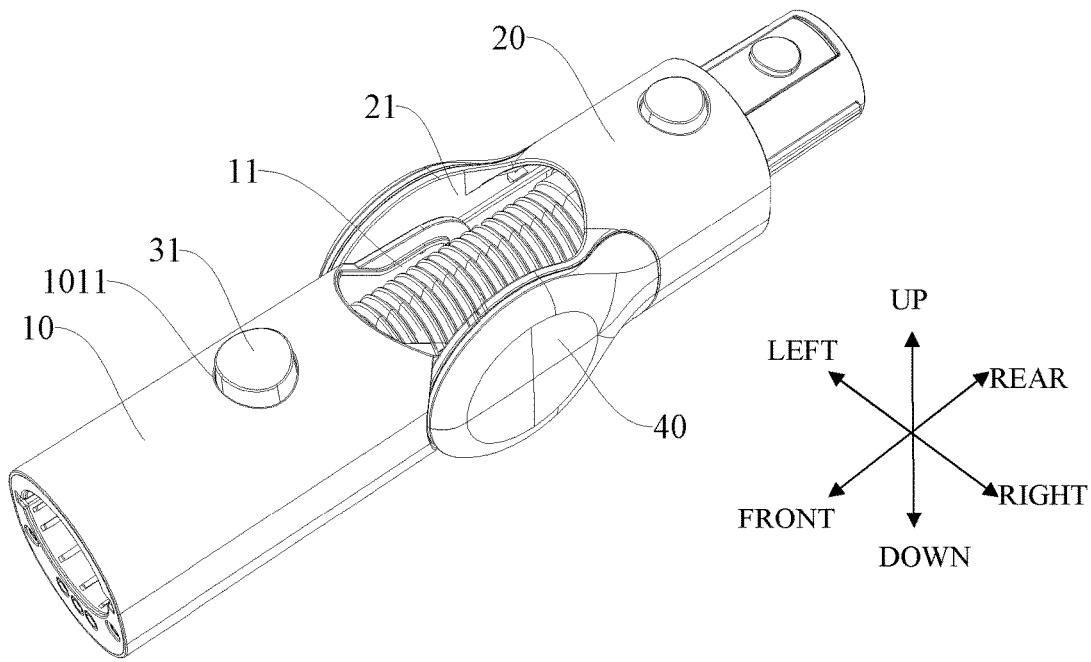
FIG. 1 is a side view of a bendable joint according to an example of the present disclosure.

Embodiments of the present disclosure are described in detail below, and examples of the described embodiments are shown in accompanying drawings. The following embodiments described with reference to the accompanying drawings are exemplary and are intended to explain the present disclosure rather than limit the present disclosure.

A bendable joint according to examples of the present disclosure will be described below with reference to the accompanying drawings.

As shown in FIG. 1 to FIG. 6, the bendable joint according to the examples of the present disclosure includes a first articulation pipe 10, a second articulation pipe 20, and a lock 30.

The first articulation pipe 10 has a first articulation portion 11 at an end of the first articulation pipe. The second articulation pipe 20 has a second articulation portion 21 at an end of the second articulation pipe. The first articulation portion 11 is articulated with the second articulation portion 21 so that the first articulation pipe 10 is rotatable relative to the second articulation pipe 20. The lock 30 is on the first articulation pipe 10 and is configured to lock and adjust relative positions of the first articulation pipe 10 and the second articulation pipe 20. With the lock, the relative positions of the first articulation pipe 10 and the second articulation pipe 20 can be accurately locked, and the relative positions of the first articulation pipe 10 and the second articulation pipe 20 can be adjusted, avoiding a problem that the bendable joint cannot be stably maintained in a predetermined state and improving user experience.

The lock 30 can realize the above functions in a variety of manners. For example, the lock 30 can lock and adjust the relative positions of the first articulation pipe 10 and the second articulation pipe 20 by a gear mechanism, a ratchet mechanism, or a pin-slot fit.

The pin-slot fit will be introduced in detail below.

In some examples, the lock 30 includes a latch 33 that is switchable between a first position and a second position. The second articulation portion 21 includes at least one limiting recess 211. In the first position, the latch 33 is inserted into one of the limiting recesses 211 to lock the relative positions of the first articulation pipe 10 and the second articulation pipe 20. In the second position, the latch 33 is removed from the limiting recess 211 to enable the first articulation pipe 10 to rotate relative to the second articulation pipe 20.

In some examples, the lock 30 further includes an unlocking button 31 and a transmission member 32, and the unlocking button 31 drives the latch 33 to switch between the first position and the second position through the transmission member 32.

It should be noted that, when an angle between the first articulation pipe 10 and the second articulation pipe 20 is adjusted, the unlocking button 31 is pressed and drives the latch 33 to move from the first position to the second position through the transmission member 32, the latch 33 is separated from the limiting recess 211 to unlock the first articulation pipe 10 and the second articulation pipe 20, and the first articulation pipe 10 and the second articulation pipe 20 rotate relative to each other. When the first articulation pipe 10 and the second articulation pipe 20 rotate to a corresponding angle, the unlocking button 31 is released, the transmission member 32 drives the latch 33 to move from the second position to the first position to cause the latch 33, and the latch 33 is inserted into the limiting recess 211, realizing the locking between the first articulation pipe 10 and the second articulation pipe 20.

For the bendable joint according to the examples of the present disclosure, with the lock 30, after the first articulation pipe 10 rotates to a corresponding angle relative to the second articulation pipe 20, the latch 33 is inserted into one limiting recess 211, and the first articulation pipe 10 and the second articulation pipe 20 are stably locked in current positions, avoiding the problem that the bendable joint cannot be stably maintained in a horizontal state or at a predetermined bending angle, and improving the user experience.

Figure 2:
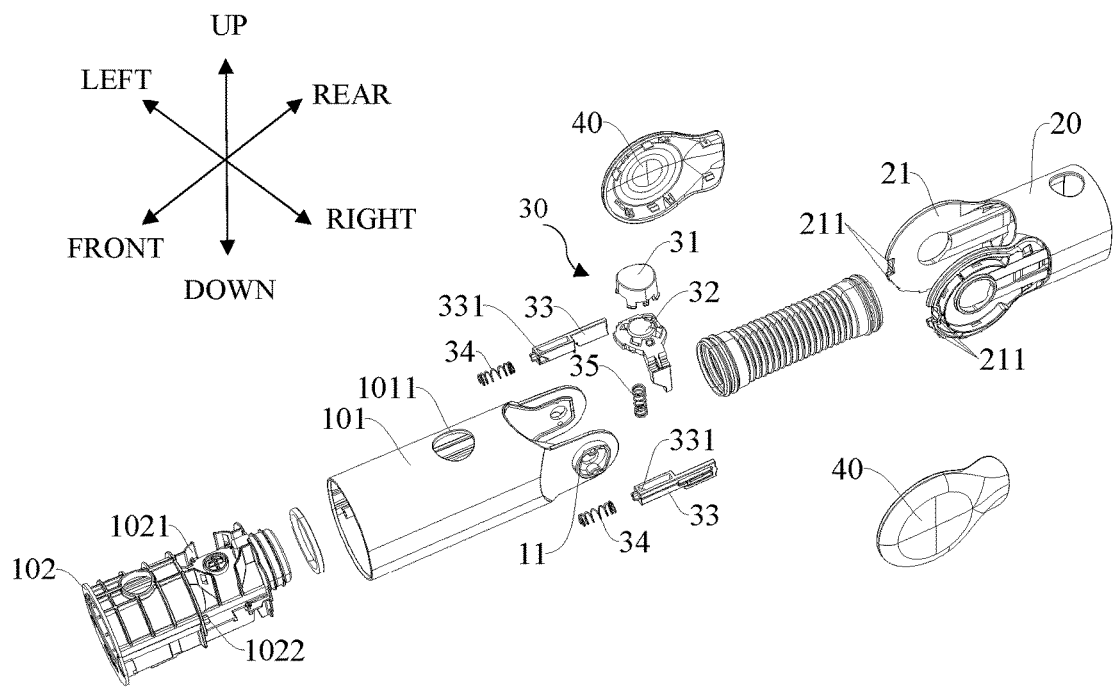
FIG. 2 is an exploded view of a bendable joint according to an example of the present disclosure.
Figure 3:
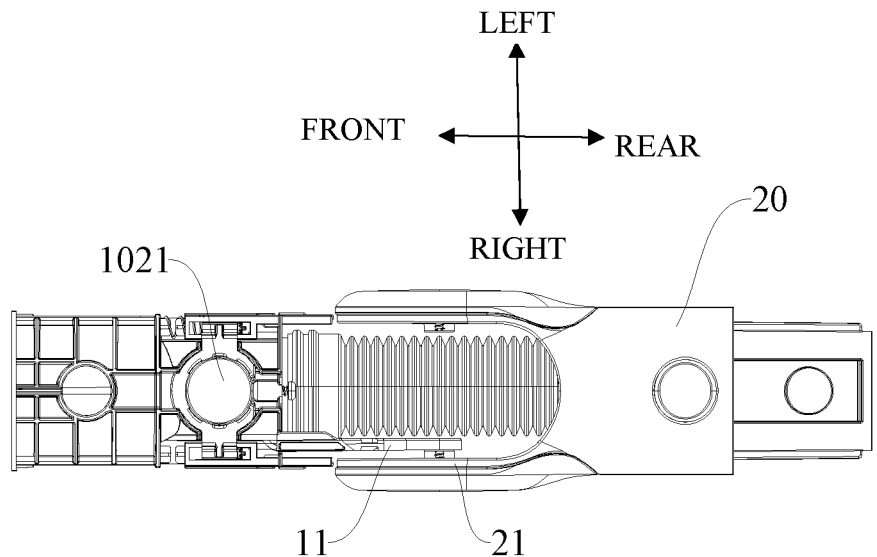
FIG. 3 is a first schematic view of a partial structure of a bendable joint according to an example of the present disclosure.

As shown in FIG. 1 and FIG. 2, the bendable joint further includes two protective covers 40. The two protective covers 40 are coaxial with the first articulation portion, and the two protective covers 40 are oppositely arranged at two axial ends of the first articulation portion. The two protective covers 40 are coupled to the first articulation pipe 10 or the second articulation pipe 20. For the bendable joint according to the examples of the present disclosure, with the protective covers 40, an appearance of the bendable joint can be beautified, interference of external debris with movement of parts at the first articulation portion 11 and the second articulation portion 21 can be avoided, and the service life of the parts at the first articulation portion 11 and the second articulation portion 21 can be prolonged.

As shown in FIG. 2 to FIG. 5, in some examples, the first articulation pipe 10 includes a housing 101 and an inner bush 102 within the housing 101. The housing 101 includes a button mounting hole 1011, and the unlocking button 31 passes through the button mounting hole 1011. The inner bush 102 has a latch mounting position 1021 and a transmission member mounting position 1022. The latch 33 is at the latch mounting position 1021 and is slidable along a direction toward the second articulation portion 21. The transmission member 32 is at the transmission member mounting position 1022 and is slidably fitted with the latch 33.

In some examples, a first elastic member 34 is between the transmission member 32 and the inner bush 102, and/or a second elastic member 35 is between the latch 33 and the inner bush 102.

In some examples, the first elastic member 34 and the second elastic member 35 are both springs.

In some examples, the transmission member 32 has a support leg 321, and the support leg 321 has a sliding slope 3211. The latch 33 has a sliding groove 331, the support leg 321 is inserted into the sliding groove 331, and the sliding slope 3211 is pressed against an inner wall of the sliding groove 331.

For the bendable joint according to the examples of the present disclosure, with the transmission member 32, the latch 33, the first elastic member 34, and the second elastic member 35, a user can unlock the first articulation pipe 10 and the second articulation pipe 20 simply by pressing the unlocking button 31; moreover, after the unlocking button 31 is released, automatic reset can be realized under elastic force of the first elastic member 34 and/or the second elastic member 35, and the locking of the first articulation pipe 10 and the second articulation pipe 20 is completed. The operation is simple, the locking is firm, and the user experience is improved.

Figure 4:
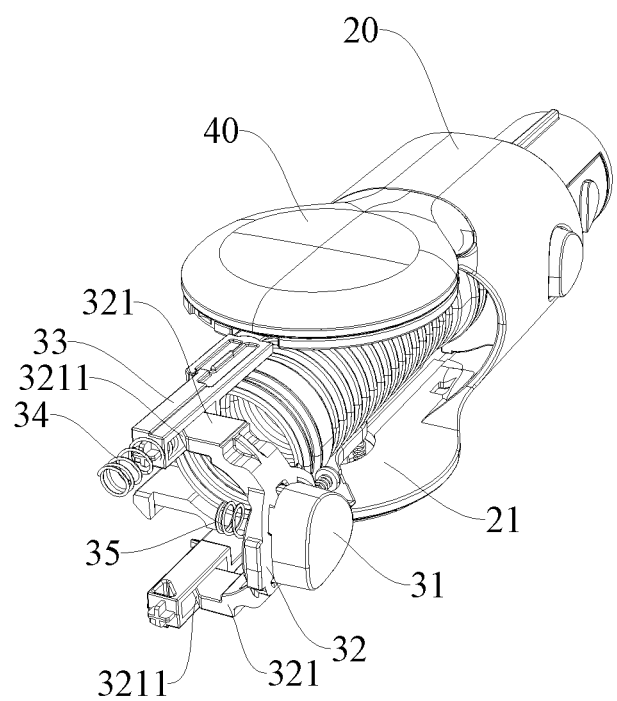
FIG. 4 is a second schematic view of a partial structure of a bendable joint according to an example of the present disclosure.
Figure 5:
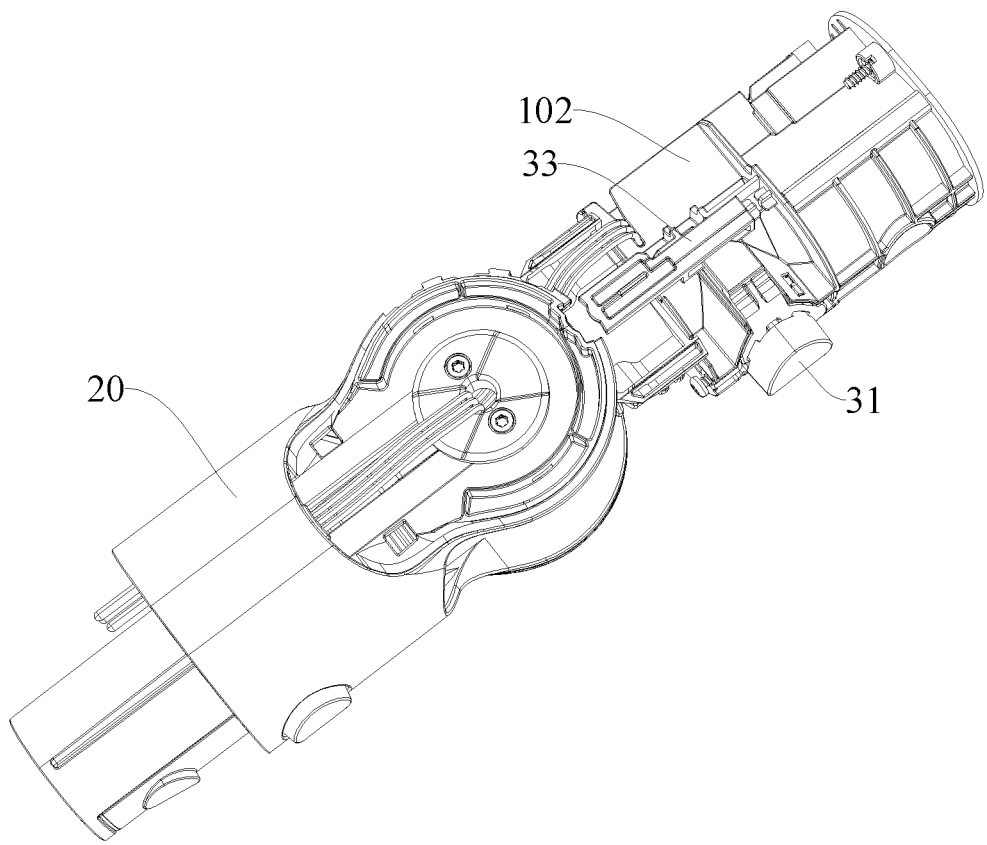
FIG. 5 is a third schematic view of a partial structure of a bendable joint according to an example of the present disclosure.
Figure 6:
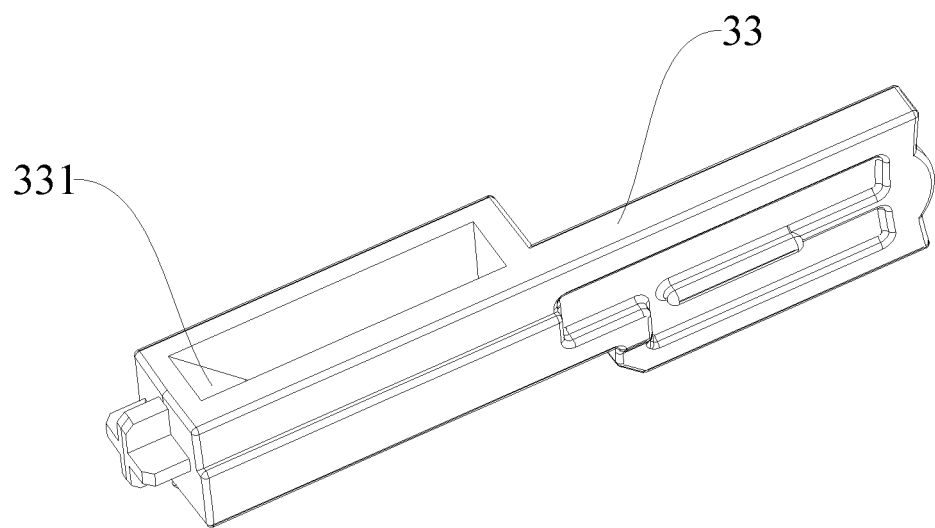
FIG. 6 is a schematic view of a latch according to an example of the present disclosure.

As shown in FIG. 2, FIG. 4, and FIG. 6, specifically, an axis of the first articulation pipe 10 and an axis of the second articulation pipe 20 are in a front-rear direction, and an axis of an articulated member between the first articulation portion 11 and the second articulation portion 21 is in a left-right direction. There are two latches 33, and the two latches 33 are oppositely arranged on left and right sides of the inner bush 102. There are two first elastic members 34, and the two first elastic members 34 are in one-to-one correspondence with the two latches 33. An axis of the first elastic member 34 is in the front-rear direction, a backward thrust is imposed on the latch 33, and the latch 33 abuts against the second articulation portion 21. When the second articulation portion 21 drives the limiting recess 211 to be flush with a right end of the latch 33, the latch 33 moves toward the limiting recess 211 and enters the limiting recess 211 under the elastic force of the first elastic member 34.

The transmission member 32 is above the latch 33. An axis of the second elastic member 35 is in an up-down direction, and an upward thrust is imposed on the transmission member 32. There are two support legs 321, and the two support legs 321 are oppositely arranged on left and right sides of the transmission member 32. A lower part of the support leg 321 is inserted into the sliding groove 331. An inner wall of the sliding groove 331 abutting against the sliding slope 3211 is wedged. Moreover, the wedged wall of the sliding groove 331 faces backward, and the sliding slope 3211 faces forward, so that the sliding slope 3211 and the wedged wall are opposite to each other. When the unlocking button 31 is pressed downward, the unlocking button 31 drives the transmission member 32 to move downward; the transmission member 32 drives the support leg 321 to move downward; and the support leg 321 drives the latch 32 to move forward under the action of the sliding slope 3211 and the sliding groove 331, until the latch 32 is separated from the limiting recess 211. When the unlocking button 31 is released, the transmission member 32 moves upward under an upward electric force of the first elastic member 35 until it is reset. At the same time, the latch 32 abuts against the second articulation portion 21 under the elastic force of the first elastic member 34.

In some examples, there are a plurality of limiting recesses 211, and the plurality of limiting recesses 211 are spaced apart from each other around an edge of the second articulation portion 21. When the latch 33 is inserted into one of the plurality of limiting recesses 211, the first articulation pipe 10 is coaxial with the second articulation pipe 20. For the bendable joint according to the examples of the present disclosure, with a plurality of limiting recesses 211, the user can selectively adjust an angle between the first articulation pipe 10 and the second articulation pipe 20 as required.

In some examples, the second articulation portion 21 is disk-shaped, the edge of the second articulation portion 21 is an arc surface, and the plurality of limiting recesses 211 are on the arc surface. For the bendable joint according to the examples of the present disclosure, the arc surface can avoid motion interference with parts in the bendable joint and even damages to the parts in the bendable joint when the first articulation portion 11 and the second articulation portion 21 rotate relative to each other.

In some examples, the plurality of limiting recesses 211 include a straight limiting recess and a plurality of curved limiting recesses. When the latch 33 is inserted into the straight limiting recess, the first articulation pipe 10 is coaxial with the second articulation pipe 20. When the latch 33 is inserted into the curved limiting recess, the first articulation pipe 10 forms a predetermined angle with the second articulation pipe 20.

In some examples, the plurality of curved limiting recesses are on a first side of the straight limiting recess, and a second side of the straight limiting recess is an arc surface. For the bendable joint according to the examples of the present disclosure, since the plurality of curved limiting recesses are on the first side of the straight limiting recess, the user can rapidly adjust the first articulation pipe 10 to be coaxial with the second articulation pipe 20; moreover, since the second side of the straight limiting recess is an arc surface, reverse rotation of the first articulation pipe 10 and the second articulation pipe 20 by the user can be prevented.

In some examples, a pressing direction of the unlocking button 31 is along a radial direction of the first articulation pipe 10, and a direction in which the latch 33 moves between the first position and the second position is parallel to an axial direction of the first articulation pipe 10.

A cleaner connecting pipe according to examples of a second aspect of the present disclosure includes a first pipe body, a second pipe body, and the above bendable joint. The first pipe body is coupled to the first articulation pipe 10, and the second pipe body is coupled to the second articulation pipe 20.

For the cleaner connecting pipe according to the examples of the present disclosure, by using the bendable joint, the user can easily and quickly adjust an angle between the first pipe body and the second pipe body, and stably maintain the first pipe body and the second pipe body in a horizontal state or at a predetermined bending angle, improving the user experience.

A cleaner according to examples of a third aspect of the present disclosure includes a main body, a cleaning head, and the above cleaner connecting pipe. The cleaner connecting pipe has a first end coupled to the main body and a second end coupled to the cleaning head.

For the cleaner according to the examples of the present disclosure, by using the cleaner connecting pipe, the user can easily and quickly adjust an angle between the first pipe body and the second pipe body, and stably maintain the first pipe body and the second pipe body in a horizontal state or at a predetermined bending angle, such that the cleaning head is stably maintained at a predetermined position, which helps the user to clean positions such as cabinet tops, and areas under sofas and beds.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features associated with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "coupled," "connected," "fixed" and the like are used broadly, and may be, for example, fixed connections, detachable connections, or integral connections; may also be mechanical or electrical connections or intercommunication; may also be direct connections or indirect connections via intermediate media; may also be inner communications or interactions of two elements. For those skilled in the art, the specific meaning of the above terms in the present disclosure can be understood according to the specific circumstances.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an intermediate medium formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the above embodiments have been shown and described, it can be understood that the above embodiments are exemplary and shall not be understood as limitation to the present disclosure, and changes, modifications, alternatives and variations can be made in the above embodiments within the scope of the present disclosure.

What is claimed is:

1. A bendable joint, comprising:
a first articulation pipe comprising a first articulation portion at an end of the first articulation pipe;
a second articulation pipe comprising a second articulation portion at an end of the second articulation pipe, the first articulation portion being articulated with the second articulation portion and the first articulation pipe being rotatable relative to the second articulation pipe; and
a lock disposed on the first articulation pipe and being configured to lock and adjust relative positions of the first articulation pipe and the second articulation pipe, wherein the lock comprises a latch switchable between a first position and a second position;
the second articulation portion comprises at least one limiting recess;
the latch in the first position is inserted into one of the at least one limiting recess and locks the relative positions of the first articulation pipe and the second articulation pipe; and
the latch in the second position is removed from the limiting recess and enables the first articulation pipe to rotate relative to the second articulation pipe;
wherein the lock further comprises an unlocking button and a transmission member, and the unlocking button drives the latch to switch between the first position and the second position through the transmission member.

2. The bendable joint according to claim 1, wherein:
the first articulation pipe comprises a housing and an inner bush within the housing;
the housing comprises a button mounting hole, the unlocking button passing through the button mounting hole; and
the inner bush has a latch mounting position and a transmission member mounting position, the latch being at the latch mounting position and slidable along a direction toward the second articulation portion, and the transmission member being at the transmission member mounting position and slidably fitted with the latch.

3. The bendable joint according to claim 2, further comprising:
a first elastic member between the transmission member and the inner bush, and
a second elastic member between the latch and the inner bush.

4. The bendable joint according to claim 3, wherein the first elastic member and the second elastic member are springs.

5. The bendable joint according to claim 3, wherein:
an axis of the first articulation pipe and an axis of the second articulation pipe are in a front-rear direction, and an axis of an articulated member between the first articulation portion and the second articulation portion is in a left-right direction;
two latches are on left and right sides of the inner bush; and
two first elastic members are in one-to-one correspondence with the two latches.

6. The bendable joint according to claim 5, wherein an axis of each first elastic member is in the front-rear direction, a backward thrust is imposed on the latch, and the latch abuts against the second articulation portion.

7. The bendable joint according to claim 3, wherein:
the transmission member is above the latch; and
an axis of the second elastic member is in an up-down direction, and an upward thrust is imposed on the transmission member.

8. The bendable joint according to claim 2, wherein:
the transmission member comprises a support leg, the support leg comprises a sliding slope; and
the latch comprises a sliding groove, the support leg being inserted into the sliding groove, and the sliding slope being pressed against an inner wall of the sliding groove.

9. The bendable joint according to claim 8, wherein two support legs are on left and right sides of the transmission member, and a lower part of each support leg is inserted into the sliding groove.

10. The bendable joint according to claim 8, wherein:
an inner wall of the sliding groove abutting against the sliding slope is wedged; and
the wedged wall of the sliding groove faces backward, the sliding slope faces forward, and the sliding slope and the wedged wall are opposite to each other.

11. The bendable joint according to claim 1, further comprising a plurality of limiting recesses spaced apart from each other around an edge of the second articulation portion, wherein the latch is inserted into one of the limiting recesses, and the first articulation pipe is coaxial with the second articulation pipe.

12. The bendable joint according to claim 11, wherein the second articulation portion is disk-shaped; the edge of the second articulation portion is an arc surface; and the plurality of limiting recesses are on the arc surface.

13. The bendable joint according to claim 11, wherein:
the plurality of limiting recesses comprise a straight limiting recess and a plurality of curved limiting recesses;
the latch is inserted into the straight limiting recess, and the first articulation pipe is coaxial with the second articulation pipe; or
the latch is inserted into the curved limiting recess, and the first articulation pipe forms a predetermined angle with the second articulation pipe.

14. The bendable joint according to claim 13, wherein the plurality of curved limiting recesses are on a first side of the straight limiting recess, and a second side of the straight limiting recess is an arc surface.

15. The bendable joint according to claim 1, wherein:
a pressing direction of the unlocking button is along a radial direction of the first articulation pipe; and
a direction in which the latch moves between the first position and the second position is parallel to an axial direction of the first articulation pipe.

16. The bendable joint according to claim 1, further comprising two protective covers that are coaxial with the first articulation portion, wherein the two protective covers are arranged at two axial ends of the first articulation portion and are coupled to the first articulation pipe or the second articulation pipe.

\* \* \* \* \*